United States Patent
Kattan et al.

(10) Patent No.: US 12,380,468 B1
(45) Date of Patent: Aug. 5, 2025

(54) METHOD FOR IDENTIFYING POTENTIAL INVESTORS IN REAL ESTATE PROPERTIES

(71) Applicant: SELL2RENT CORPORATION, Miami, FL (US)

(72) Inventors: Daniel Kattan, Miami, FL (US); Andres Loi, Davie, FL (US)

(73) Assignee: SELL2RENT CORPORATION, Miami, FL (US)

( * ) Notice: Subject to any disclaimer, the term of this patent is extended or adjusted under 35 U.S.C. 154(b) by 0 days.

(21) Appl. No.: 18/308,073

(22) Filed: Apr. 27, 2023

Related U.S. Application Data

(60) Provisional application No. 63/363,880, filed on Apr. 29, 2022.

(51) Int. Cl.
*G06Q 30/0251* (2023.01)
*G06Q 50/16* (2024.01)

(52) U.S. Cl.
CPC ..... *G06Q 30/0255* (2013.01); *G06Q 30/0269* (2013.01); *G06Q 50/16* (2013.01)

(58) Field of Classification Search
CPC . G06Q 30/0255; G06Q 30/0269; G06Q 50/16
USPC .............. 705/27.1, 313, 14.5, 14.53
See application file for complete search history.

(56) References Cited

U.S. PATENT DOCUMENTS

| | | | |
|---|---|---|---|
| 2009/0048938 A1* | 2/2009 | Dupray | G06Q 30/0641 705/27.1 |
| 2010/0063829 A1* | 3/2010 | Dupray | G06Q 30/0603 705/313 |
| 2012/0066061 A1* | 3/2012 | Clement | G06Q 30/0251 705/14.49 |
| 2014/0067497 A1* | 3/2014 | Butler | G06Q 30/0251 705/14.5 |
| 2022/0327643 A1* | 10/2022 | Law | G06Q 50/16 |

OTHER PUBLICATIONS

Kenny Rushing, How Do Real Estate Investors Identify Target Markets?, 2021 (Year: 2021).*

* cited by examiner

*Primary Examiner* — Tarek Elchanti
(74) *Attorney, Agent, or Firm* — Lott & Fischer, PL

(57) ABSTRACT

Described is a novel method to identify potential investors proximal to a target real estate property ("Target Property,") the method identifies investors having a high probability of purchasing the Target Property with a tenant already in place. The method also ranks identified potential investors, based on their calculated potential interest in the purchase, and identifies communication channels with the potential investors to automate and facilitate presentation of the opportunity to purchase the Target Property.

5 Claims, 1 Drawing Sheet

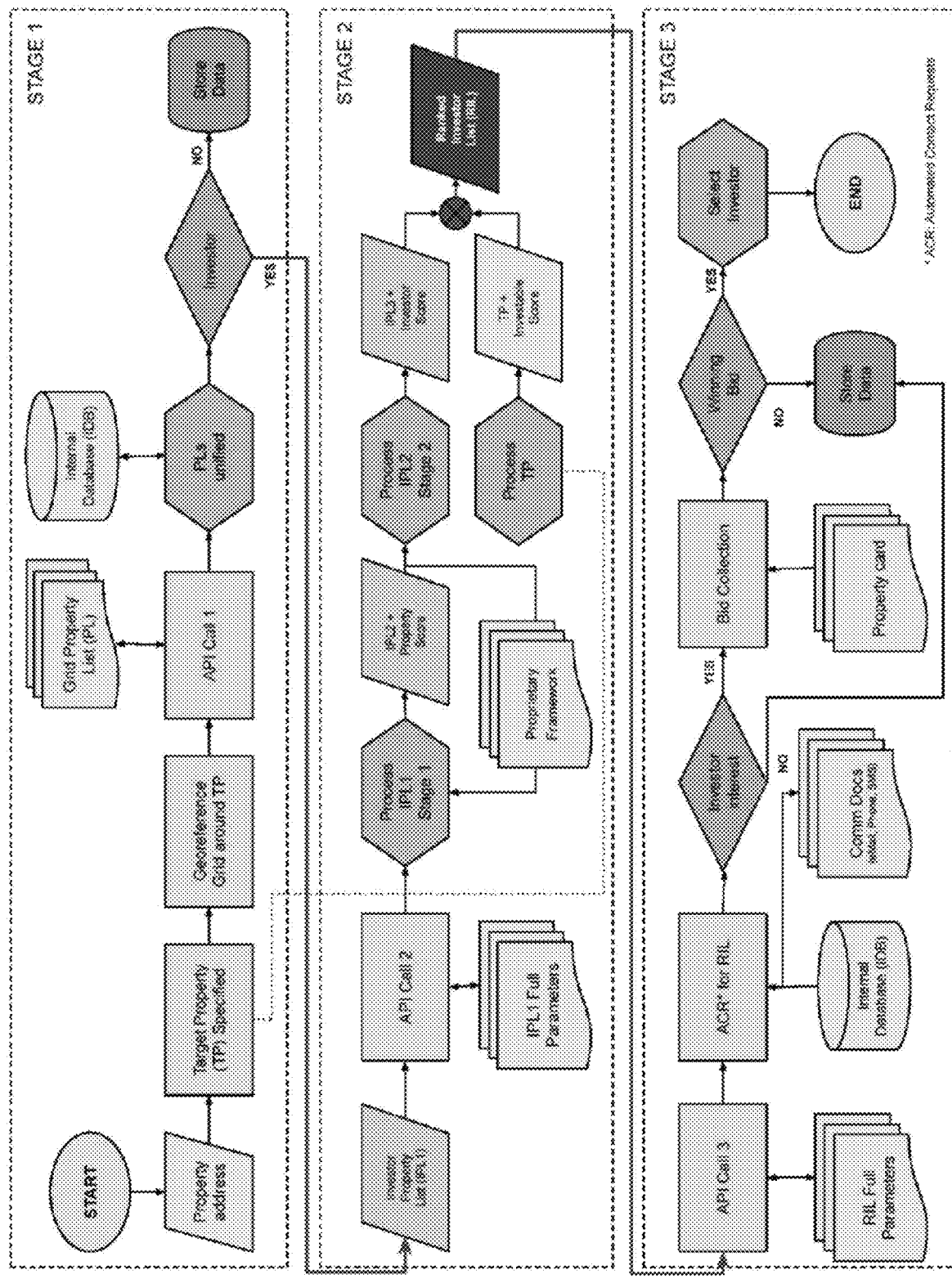

METHOD FOR IDENTIFYING POTENTIAL INVESTORS IN REAL ESTATE PROPERTIES

CLAIM OF PRIORITY

This application is being filed as a non-provisional patent application under 35 U.S.C. § 111(b) and 37 CFR § 1.53(c). This application claims priority under 35 U.S.C. § 119(e) to U.S. provisional patent application Ser. No. 63/363,880 filed on Apr. 29, 2022, the contents of which are incorporated herein by reference.

FIELD OF INVENTION

The invention relates generally to real estate transactions and in particular to methods to identify potential investors in real estate properties.

SUMMARY OF THE INVENTION

Described is a novel method to identify potential investors proximal to a target real estate property ("Target Property.")

The construction of the invention, together with objects and advantages thereof will be best understood from the following description of the specific disclosed embodiments when read in connection with the accompanying drawings.

BRIEF DESCRIPTION OF THE DRAWINGS

FIG. 1 is a flowchart representing the various steps in the method of an embodiment of the present invention.

DETAILED DESCRIPTION OF THE INVENTION

The disclosed method identifies investors having a high probability of purchasing the Target Property with a tenant already in place. The method also ranks identified potential investors, based on their calculated potential interest in the purchase, and identifies communication channels with the potential investors to automate and facilitate presentation of the opportunity to purchase the Target Property.

As shown in FIG. 1, the method comprises the following steps in 3 stages

Stage I
Step 1
The Target Property's address is provided.
Step 2.
Using mapping software, the Target Property's address is located on a digital map and a virtual perimeter is drawn around the Target Property. The virtual perimeter can consist of a polygon or any other shape whose parameters (e.g., center, area, radius, dimensions, etc.) are defined by the method's user. The virtual perimeter can also consist of existing or known geographic subdivisions, such as a zip code or a political subdivision (e.g., city, county, or state limits). The virtual perimeter is then converted to a georeferenced grid of coordinates.
Step 3
Based on the georeferenced grid of coordinates, one or more real estate property databases are cross referenced, optionally through an API (application programming interface), and all real estate properties located inside the georeferenced grid of coordinates are identified. Data regarding the identified properties is entered into a new database table for further processing.
Step 4
The identified properties are then processed to extract the names of the owner of each property, and the properties are sorted and ranked by relevance. Properties in which the owner is more likely to invest in the Target Property are ranked higher.
Stage II
Step 5
With the ranked owner and property table in place, an additional cross reference is made to one or more additional real estate property databases to obtain, for each ranked owner, additional parameters for the owner's corresponding property: for example, square footage, bedroom count, bathroom count, lot size, whether there is a pool or garage, last purchase date, last purchase price. These additional parameters are appended to the original ranked owner and property table.
Step 6
The ranked owner and property table is again sorted and filtered to extract owners and properties that are similar, within a provided threshold, to the Target Property. Each of the extracted owners and properties is then assigned a score ("Property Score"). The Property Score is based on numerical analysis of each data point for each property, and it's standard deviation from the same data point for the Target Property, with regular and weighted averages applied based on a machine learning algorithm that has been trained extensively in this process.
Step 7
The location of other properties owned by potential investors, and the Property Scores for those properties are then analyzed and calculated to create at an "Investor Score" that measures the likelihood that a potential investor will be interested in purchasing the Target Property.
Step 8
The current market price and rent estimate for all properties with high Investor Scores are then analyzed and compared with the Target Property to assign an Investable Score to the Target Property. See below for further details of Investable Score Process.
Step 9
Once the Property Score, Investor Score, and Investable Score are calculated, a machine learning protocol is applied to the collected data and a list of potential investors is ranked according to the likelihood that each investor would purchase the Target Property.
Stage III
Step 10
Having identified the investors most likely to purchase the Target Property, information about the identified investors is cross-referenced to a separate database to extract the identified investors' phone numbers, emails, and/or any other contact information publicly or privately available.
Step 11
Using the contact information obtained from step 10, e-mails, phone calls, post cards, text messages, and/or other types of communications are automatically generated to the investors, offering them the option to purchase the Target Property. These communications will have the option of just requesting interest from the investor to including a property card with an analysis of why they should purchase this property based on their current investment strategy extracted from their activity in the georeferenced area around the Target Property.

Step 12

Optionally, a report is generated and presented via a web page/app or PDF detailing call or selected activity from the previous steps.

Step 13

Optionally, bids from interested investors are automatically requested, feed them into the platform and CRM system, and notified to the agent(s) in charge of the Target Property to select the best bid for the owner of the Target Property.

Part of the disclosed process involves aggregating data from different databases at different stages. The process is optimized to minimized the amount of data required to achieve the desired results. This is done to minimize the expense of conducting the disclosed process.

Investable Score Process—Detailed Description

The objective for this score is to give an idea about the SFR (Single Family Residence) investor activity around an area.

This score has several applications, and it can be used by all the actors of the SFR asset class:

Owner Occupied Buyers
Investors
Sellers
Realtors
Lenders
Financial System
Economists
Policy Makers The Score The main Score will consist of the concentration of Investor properties in a given area. This will be expressed as a percentage or a scale. The process will correct for properties that are second home and are occupied by tenants.

The score will have separate sub scores that will allow for a greater understanding of the dynamics of the area:

Concentration properties: of investor properties in the area.
Institutionality: what is the makeup of those investors, more institutional, vs mom/pop.
Regionality: Are these investors local or national? where are those investors buying? This requires knowing that an investor that buys in the zip code we are analyzing in Florida, also buys in California.
Liquidity Total: # units and $ for the X properties (owner-occupied/investment) that were sold in the Y months.
Liquidity Investable: Same as liquidity total but only investor properties.
New Investors: How many new investors are buying in the area?
Cap Rate: What is the gross cap rate of the properties purchased in the area. For that we need to know the estimated rent of the property when it was purchased.
Type of property: If we can get the data on this, what type of properties SFR vs Condo/Vs Townhome vs Properties with HOA.

Control Panel

The score is dynamic and can be adjusted to allow the user to define the constraints of the data being analyzed:

Search area: area/zip around property.
Time: How far back.
Similarity Bed/Bath: Range of bed bath.
Similarity Area: Range SQF.
Similarity Year Built: Rangen Year built Case Uses for Investable Score Home Buyers (owner occupied): Understand what type of NH you are buying in. The same way that those homeowners are looking at safety and school, they should understand what type of NH they will be living in. NH with larger properties of renters might not be as "stable" as ones with no renters.

Investors: The percentage of rental properties allows them to decide if they want to compete for properties in that area with other investors. It can also be an indication of an area that is not good for investment. Also by looking at the Institutionalization SFR funds can look to purchase rented properties in areas with high concentration of mom and pop investors.

Sellers: It can allow for sellers to find out who is buying in the area and approach the investor buyers directly.

Realtors: It will allow realtors to better understand the buyers in the area and target their marketing campaign. In addition, n realtors can also help investors understand the dynamics of the area and target potential acquisitions.

Lenders: Understands the different sub scores of the IS allows a lender to assess risk in an area. Areas with low concentration of investors might not have the same liquidity as areas with high concentration of investors.

Economist/Policy Makers: Understanding the investor dynamics of an area/city might allow economists to better forecast economic conditions. Policy makers can also be guided when enacting policies that might affect a certain group of owners (homeowners vs investors).

Financial System: Allows financial analysts to better understand risk behind the securitizations of SFR.

Investor Search Protocol (Alternative Embodiment)

The user input the Property Address to the Process using our investor portal platform, alternatively, zip code and radius can be specified. All the parameters are then converted to Georeferenced coordinates and fed into the Process.

Given the georeferenced grid of coordinates, the platform consults our property database, and at the same time, connects to a list of 3rd party data vendors through API (Application Programming Interface) and extracts additional lists of properties that are inside the grid. All lists are then unified and inserted into our database in a find request table for processing.

Then, the process sorts, processes, and filters all properties that we have identified using our internal AI to have investor owners and begins ranking them by the level of importance. This is a proprietary ranking system parameter defined by us.

The ranked table of properties in place, the Process executes a cross query with another property database and 3rd party data provider to obtain, for each ranked investor, the relevant parameters for the property in question: square footage, bedroom count, bathroom count, lot size, pool, garage, last purchase date, last purchase price. The Process will then append these data points to the original ranked investor list.

The Process will now sort and filter the investor properties table again and leave only properties that match the original property for sale past a preselected threshold. For all remaining properties, the Process will apply a proprietary scoring system based on numerical analysis of each data point, and it's standard deviation from the property to be sold, with regular and weighted averages applied based on a semi-supervised machine learning process that has been trained extensively in this process. We will call this the Property Score.

The Process will then analyze using our proprietary framework the location of other properties and the scores of each investor's owned properties, creating an Investor Score that will measure the likelihood of that investor to purchase the subject property. Then, the Process will analyze the current market price and rent estimate for all high scoring properties and compare them to the subject property and assign this Investable Score to it.

Once we have acquired the Property Scores, Investor Scores, and Investable Score, the Process will apply the final proprietary machine learning protocol. The result of this process is a list of investors ranked by the likelihood of purchasing the purchase property.

Having identified the most promising investors, a second process will take over and connect our Ranked Investor List (RIL) to our internal database and a 3rd party database to acquire their phone numbers, emails, and/or any other contact information publicly available.

Using the contact information obtained, the platform will automatically generate emails, phone call requests, postcards and text message campaigns to the investors, offering them the property. These communications will have the option of just requesting interest from the investor to include a property card with an analysis of why they should purchase this property based on their current investment strategy extracted from their activity in the georeferenced area around the subject property.

A report is generated and presented via a web page/app or PDF. If required by the user, the Process will in its last step can automatically request to receive bids from interested investors, feed them into our platform and CRM and generate notifications on these bids for the agent in charge of the subject property to select the best bid for the homeowner of the subject property.

Note: Part of the Process involves aggregating data from different databases at different stages. The Process is optimized to reduce the amount of data required to achieve the desired results.

In addition, various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A method for targeting investors having a high probability of purchasing a Target Property with a tenant already in place using a portal platform, the method comprising the steps of:

inputting an address of the Target Property into the portal platform, the portal platform using mapping software to locate the Target Property;

using the mapping software to select a perimeter area around the Target Property;

converting the perimeter area to a georeferenced grid of coordinates;

the portal platform identifying nearby properties within the georeferenced grid of coordinates using the mapping software;

the portal platform identifying owners of the identified nearby properties within the georeferenced grid of coordinates;

the portal platform cross-referencing the identified owners and identified nearby properties with one or more third party real estate property databases using an Application Programming Interface to connect to the one or more third party real estate property databases and extract additional parameters regarding the identified owners and the identified nearby properties;

the portal platform sorting, processing, filtering, and ranking the identified nearby properties using artificial intelligence;

the portal platform executing another cross query with one or more additional third party databases to extract additional parameters regarding the identified nearby properties;

the portal platform sorting and filtering the identified nearby properties;

the portal platform generating a Property Score for each of the remaining identified nearby properties and the identified owners using a scoring system based on a numerical analysis of each of the remaining identified nearby properties, and a standard deviation of each of the remaining identified nearby properties from the Target Property, with regular and weighted averages applied based on a trained machine learning algorithm;

the portal platform analyzing the Property Score to calculate an Investor Score for each identified owner measuring a likelihood of each of the identified owners of purchasing the Target Property;

the portal platform comparing market prices and rent estimates of the identified nearby properties to the Target Property and assigning an Investable Score to the Target Property based on said comparison;

the portal platform identifying and ranking potential investors from among the identified owners based on their calculated potential interest in purchasing the Target Property by applying a machine learning protocol to the Property Score, Investor Score and Investable Score;

the portal platform identifying and selecting communication channels with the potential investors from the additional parameters cross-referenced from the one or more third party real estate property databases; and the portal platform generating automated contact requests and presenting to the potential investors, through the identified communication channels, an opportunity to purchase the Target Property.

2. The method of claim 1 wherein the step of the portal platform identifying and ranking potential investors based on their calculated potential interest in purchasing the Target Property further comprises extracting an investment strategy of each of the potential investors based on their investor activity within the selected perimeter area.

3. The method of claim 2 wherein the step of the portal platform generating automated contact requests and presenting to the potential investors an opportunity to purchase the Target Property further comprises providing an analysis to the potential investors of why the potential investors should purchase the Target Property based on the extracted investment strategy of the potential investors.

4. The method of claim 1 further comprising the portal platform automatically requesting to receive bids from the potential investors for the Target Property, storing the bids in the portal platform, and generating notifications regarding the bids.

5. The method of claim 1 further comprising the portal platform generating and presenting a report via a webpage or application, the report detailing selections of the potential investors with respect to the opportunity to purchase.

* * * * *